United States Patent [19]

Avramopoulos et al.

[11] Patent Number: 5,369,520
[45] Date of Patent: * Nov. 29, 1994

[54] OPTICAL REGENERATION CIRCUIT

[75] Inventors: Hercules Avramopoulos, Red Bank; Norman A. Whitaker, Jr., Atlantic Highlands, both of N.J.

[73] Assignee: AT&T Corp., Murray Hill, N.J.

[*] Notice: The portion of the term of this patent subsequent to May 3, 2011 has been disclaimed.

[21] Appl. No.: 887,034

[22] Filed: May 22, 1992

[51] Int. Cl.$^5$ .................. H04B 10/02; H04J 14/08
[52] U.S. Cl. ......................... 359/176; 359/174; 359/139; 359/158; 375/4
[58] Field of Search ............. 359/174, 175, 176, 177, 359/179, 128, 139, 158; 375/4

[56] References Cited

U.S. PATENT DOCUMENTS

| | | | |
|---|---|---|---|
| 4,527,286 | 7/1985 | Haworth | 359/176 |
| 4,543,664 | 9/1985 | Couch | 359/176 |
| 4,747,094 | 5/1988 | Sakaguchi et al. | 359/174 |

FOREIGN PATENT DOCUMENTS

| | | |
|---|---|---|
| 0456422 | 11/1991 | European Pat. Off. . |
| 1150121 | 9/1989 | Japan . |
| 1241232 | 12/1989 | Japan . |
| 2052535 | 5/1990 | Japan . |
| 9114963 | 10/1991 | WIPO . |

*Primary Examiner*—Richard E. Chilcot, Jr.
*Assistant Examiner*—Rafael Bacares
*Attorney, Agent, or Firm*—John A. Caccuro

[57] ABSTRACT

An optical regenerator includes a clock recovery circuit which recovers an optical clock signal from a received deteriorated optical data signal. The recovered optical clock signal is used to generate a new optical clock signal. The new optical clock signal and the received deteriorated optical data signal are applied as an input signal and control signal, respectively, to a Sagnac switch which encodes the new optical clock signal with the encoded information of the deteriorated optical data signal thereby regenerating a clean optical data signal.

18 Claims, 2 Drawing Sheets

201 – ELECTRICAL DATA INPUT 109 
1  1  0  1  0  0  1

202 – OPTICAL OUTPUT, TRANSMITTER 110

203 – OPTICAL INPUT, REPEATER 120

204 – OPTICAL OUTPUT, REPEATER 120

205 – ELECTRICAL DATA OUTPUT 151 
1  1  0  1  0  0  1

206 – OPTICAL CLOCK SIGNAL

OPTICAL REGENERATION CIRCUIT

BACKGROUND OF THE INVENTION

This invention relates to optical communication circuits and, more particularly, to an all-optical repeater for use in an optical communication system.

The most important feature of optical digital signal transmission is the ability to reconstruct the transmitted pulse train after it has traveled through a dispersive and noisy medium (free-space, optical fiber, etc.). This process of reconstructing the pulse train is performed at intervals along the transmission path by regenerative repeaters.

In prior art optical communication system repeaters, received optical signals are converted to electrical signals and processed using well-known electronic circuits and then convened to an optical signal for transmission. As bit rates increase, the expense and complexity of performing regeneration electronically rise dramatically. The initial design is much more difficult at high speeds, and the extreme reliability required of telecommunications repeaters compounds the cost. Thus, there is a continuing need to improve the performance of optical regenerators.

SUMMARY OF THE INVENTION

We have recognized that the transfer characteristics of a Sagnac loop provide a limiter function which could be utilized in an optical regenerator. Moreover, we have recognized that a Sagnac loop could, desirably, be used to reduce timing jitter, amplitude jitter, and wavelength chirp in an optical regenerator. In accordance with our invention, an optical regenerator includes a clock recovery circuit which recovers an optical clock signal from a received deteriorated optical data signal. The recovered optical clock signal is used to generate a new optical clock signal. The new optical clock signal and the deteriorated data signal are applied as an input signal and control signal, respectively, to a Sagnac switch which regenerates an optical data signal from the deteriorated data signal. More specifically, the Sagnac uses the deteriorated data signal to encode the new clock signal and thereby regenerate a clean optical data signal.

The use of an "all-optical" regenerator makes possible the regeneration of telecommunications signals with much less complexity, and uses optical components which are much easier to qualify for high-reliability operation. Even if electronics is used for the narrowband portion of the circuit (clock recovery), the ultra-wide bandwidth of optical processing makes it deskable for the broadband portion (regeneration).

According to one embodiment of the invention, the wavelength of the new clock signal is different from the wavelength of the received deteriorated data signal. Hence in such an embodiment, the wavelength of the regenerated optical data signal is different from the wavelength of the deteriorated data signal. An optical communication system is implemented using an optical communication medium and using our optical regenerator as part of an optical repeater or receiver.

DETAILED DESCRIPTION

In the following description, each item or block of each figure has a reference designation associated therewith, the first number of which refers to the figure in which that item is first located (e.g., 130 is located in FIG. 1 and wave form 202 is located in FIG. 2).

Figure 1:
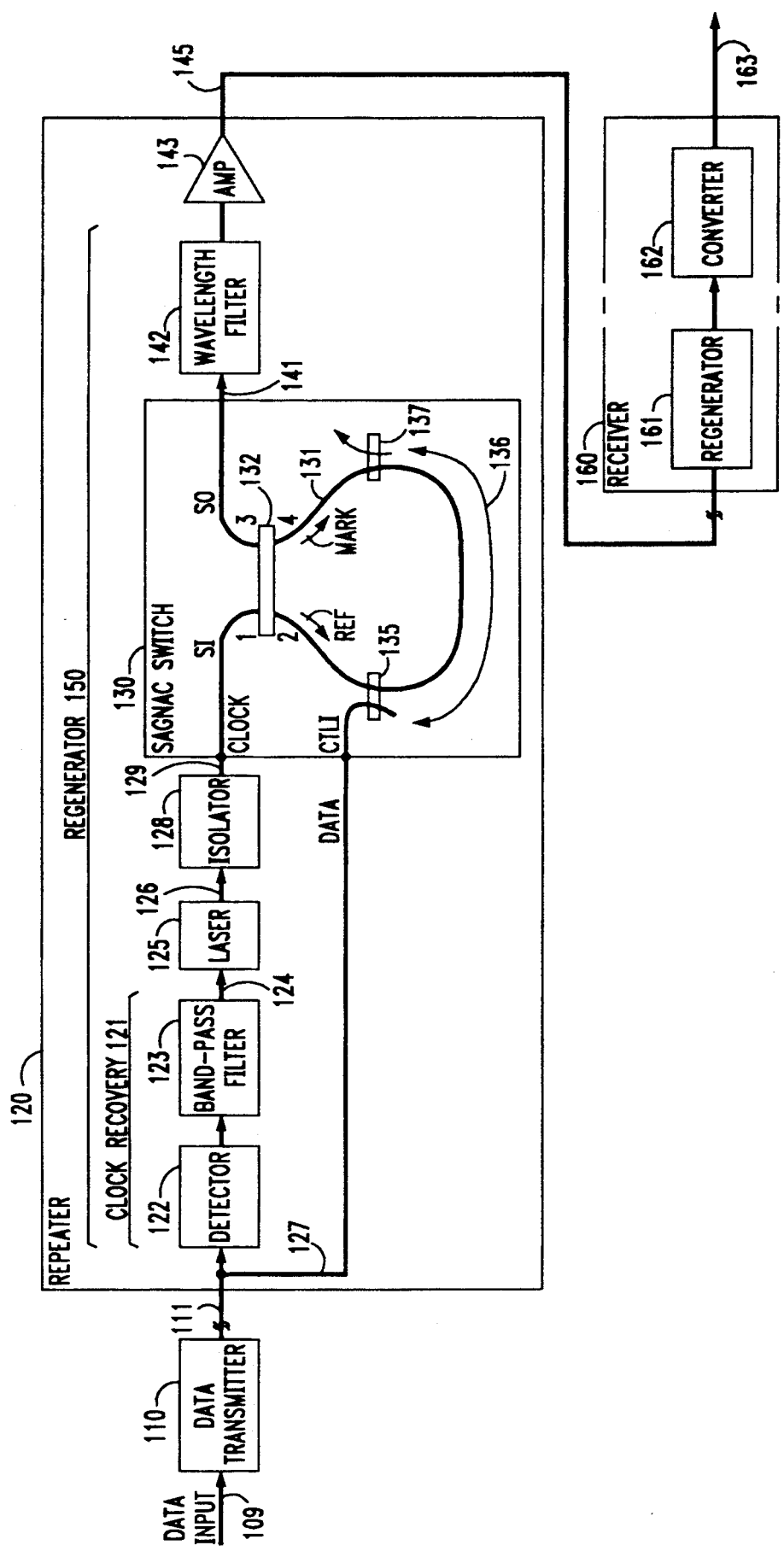
FIG. 1 shows a block diagram of an illustrative optical communication system including a repeater implemented in accordance with the present invention and FIG. 2 shows illustrative signal waveforms useful in understanding the present invention.
Figure 2:
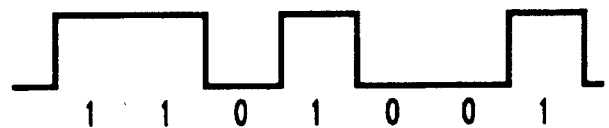
Figure 2:
Figure 2:
Figure 2:
Figure 2:
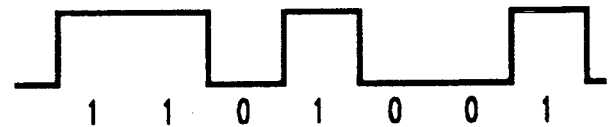
Figure 2:

Shown in FIG. 1 is a block diagram of an illustrative optical communication system including an optical data transmitter 110; one or more repeater links including optical fiber link 111 and optical data repeater 120; optical fiber link 145; and optical data receiver 160. The optical repeater 120 as well as optical data receiver 160 may include our optical regenerator 150 for regenerating optical data signals. In a well-known manner, optical data transmitter 110 generates optical data output signal 202 shown in FIG. 2 from the electrical input data signal 201 on input data lead 109. Optical fiber link 111 is a dispersive and noisy medium which distorts the transmitted optical data signal 202 producing the distorted optical data signal 203 which is inputted to repeater 120. Repeater 120 uses regenerator 150 to regenerate the optical data signal, as shown by 204, for its subsequent transmission over optical fiber link 145 where data receiver 160 detects the received optical data signal and converts it to electrical signal 205 on data output lead 163.

The use of an "all-optical" regenerator 150 makes possible the regeneration of telecommunications signals with much less complexity and uses optical components (laser 125, isolator 128, Sagnac switch 130 and wavelength filter 142), which are much easier to qualify for high-reliability operation. Even if electronics is used for the narrowband portion of the circuit (clock recovery circuit 121), the ultra-wide bandwidth of optical processing makes it desirable for the broadband portion (Sagnac switch 130 performs the regeneration).

Optical data regenerator 150, illustratively, may include a clock recovery circuit 121, laser 125 and Sagnac switch 130. The well-known clock recovery circuit 121, illustratively includes an optical signal detector 122 and a band-pass filter 123 to recover a clock signal from the received optical data signal 111. Optical signal detector 122 converts the received optical data signal 111 to an electrical data signal which is then filtered by band-pass filter 123 to reconstruct a sinusoidal clock signal 124 at the received data rate.

Band-pass filter 123 includes an optional electronic amplifier (not shown) to adjust the electrical signal level for the modelocked laser 125. By using a hi-Q filter, a sinusoidal signal is produced which bears a fixed phase relationship to the incoming data 111, and which tracks any wander in the frequency or phase of the transmitted data stream. The sinusoidal clock signal 124 from the band-pass filter 123 is used to modelock an actively modelocked laser 125 which generates a new optical clock signal 126. The optical clock signal 126 passes through isolator 128.

The new or recovered optical clock signal 129 and received optical data signal 127 provide inputs to Sagnac switch 130. Such a Sagnac switch is described in more detail in the commonly assigned U.S. Pat. No. 5,144,375, issued Sep. 1, 1992 to Gabriel, Houh and Whitaker entitled "Sagnac Optical Logic Gate," which is incorporated by reference herein.

We have recognized that the Sagnac switch 130 provides several characteristics which are desirable for use in optical repeater 120. For example, as will be described in more detail in later paragraphs, Sagnac switch 130 is insensitive to timing jitter and amplitude jitter. Additionally, the AND logic function performed by Sagnac switch 130 enables the optical repeater to encode the clock signal 129 with the information content of the received data signal 127. Furthermore, the Sagnac switch 130 eliminates wavelength chirp (the frequency dispersion of an optical pulse). The resulting repeater 120 thus possesses desirable timing jitter, amplitude jitter, wavelength chirp and pulse shape restoration characteristics. Optical repeater 120 effectively regenerates a data output signal over fiber link 145 having the original characteristics of the data signal transmitted from data transmitter 110.

Sagnac switch 130, illustratively, includes an optical transmission medium, i.e., optical fiber 131, that is connected at both ends to a Polarization Maintaining Coupler (PMC) 132. An input optical clock signal 129 is applied to an input SI which is port 1 of coupler 132. Ports 2 and 4 of coupler 132 are connected to the two ends of fiber 131, and port 3 of coupler 132 forms an output SO of the Sagnat loop. Fiber 131 thus forms a loop, (also referred to herein as fiber loop 131) which in the context of this disclosure, refers to the path over which a signal travels and, more particularly, to arrangements where the path forms a closed, or nearly closed, figure.

The Sagnat switch 130 operates as follows. Clock signal 129 is applied to port 1 and is split into two parts that exit coupler 132 at ports 2 and 4: a "ref" signal that travels clockwise, and a "ref" signal (reference signal) that travels counter-clockwise. The "ref" and "ref" signals travel through the loop in opposite directions, re-enter coupler 132 and recombine therein. Under normal circumstances, the "mark" and "ref" signals experience the same conditions as they travel through the loop. Even though the propagation speed is a function of many parameters that may be uncontrollable and may or may not change with time, the travel time of the "ref" and "mark" signals is short enough that, basically, all of the parameters remain static. Consequently, no changes occur within the loop to differentiate between the effects of the fiber on the signals traveling in the two directions. The result is a combining of signals in coupler 132 that is constructive with respect to port 1 and destructive with respect to port 3. In consequence, light that enters port 1 of coupler 132 is completely reflected back to port 1, and no output is delivered to port 3.

In addition to the above-described structure, Sagnat switch 130 includes a wavelength combining coupler 135 that injects a control signal 127 at port CTLI into a segment 136 of the fiber loop 131. Because coupler 135 is within loop 131, the control signal travels along loop 131 only in one direction; and more specifically, coupler 135 is arranged to inject the control signal that travels along loop 131 in the direction of the "ref" signal. A wavelength combining coupler 137 may also be included within the loop of fiber 131 to extract the pulse out of the loop once it has served its control function.

Segment 136 of fiber 131 is a variable refractive-index material that is characterized by the property that the propagation speed of a beam passing through the material is a function of the intensity of the beam that passes through the material. Furtherefore, not only does the propagation speed change for the beam (e.g., control signal) that effects the change in propagation speed, but it also changes the propagation speed of other beams (e.g., "mark" signal) that pass through the material at the same time. The nonlinear interaction between the control signal and the "mark" signal is by means of cross-phase modulation due to the optical Kerr effect. Of course, the entire length of fiber 131 may be made of such a variable refractive-index material, but for the sake of generality, fiber 131 is drawn as having only a limited segment 136 being made up of this material. Also for the sake of generality, it should be pointed out that the loop of fiber 131 in FIG. 1 does not necessarily have to be fiber. It can be a waveguide, or other means for directing the flow of light.

In sum, the Sagnat switch 130 includes a fiber loop 131 having a controllable propagation speed material in segment 136, "mark" and "ref" signals traveling through the loop in opposite directions and combined in coupler 132 and a control signal (data signal 127) that is injected at coupler 135 which travels in the same direction as the "mark" signal over segment 136 and extracted by coupler 137. When the "mark" and control signals are properly timed and conditioned, the result is a single-pole double-throw switch type apparatus. When the control signal is not present, the "mark" and "ref" signals are combined in coupler 132 as described above. The signal entering the switch at port 1 reflects out of the loop of fiber 131 and exits port 1 of coupler 132. However, when the control signal is present and is made to travel through segment 136 with the "mark" signal, the change in propagation speed of the "mark" signal that is caused by the control signal alters the phase of the "mark" signal arriving at coupler 132. When the energy in the control signal and the interaction internal within segment 136 (between the "mark" and control signals) are properly controlled, the resulting phase relationship between the "mark" and "ref" signals is approximately $\pi$ radians, meaning that the "mark" signal is about 180° out-of-phase to the "ref" signal. This causes the combining of the "mark" signal and the "ref" signal in coupler 132 to be completely destructive with respect to port 1 and completely constructive with respect to port 3. As a result, all of the energy exits at port 3 (non-reflected signal output port) rather than at port 1 (reflected signal output port). It may be noted in passing that the "ref" signal also passes through segment 136 and that its speed is also somewhat affected by the control signal. But, since the control signal and the "ref" signal travel in opposite directions, their interaction time is much shorter than the interaction time of the "mark" and the control signals.

To ensure the proper operation of the Sagnac switch (that is to minimize the distortion of the pulse which outputs at port 3) requires that the control signal completely traverse the "mark" signal during its transit through segment 136 of the fiber loop 131. This is accomplished by requiring that the material of segment 136 have a dual speed characteristic, one that propagates the control signal at a different rate than the "mark" signal. The difference in the propagation speed may be tied to any controllable parameter of the control signal, such as wavelength, intensity or polarization. In the illustrative embodiment different wavelengths are utilized. That is, the wavelength of laser 125 clock signal is different than the wavelength of the input data signal 127.

As long as the input data signal 127, which acts as the control signal, completely traverses the "mark" signal (generated from laser 125 clock signal) within segment 136 the Sagnac switch operation is completely insensitive to the shape of the control signal or its precise timing. Rather, it is only sensitive to the overall energy of the control signal (integral of the control pulse).

In the present embodiment, since the control signal is actually the input data signal 127 it has the same clock rate as the clock signal 129. As previously noted, however, the control signal 127 and clock signal 129 have different wavelengths. Segment 136 is selected to have a controllable parameter based on wavelength; thus, fiber loop 131 is formed from dispersive fiber. The wavelength of the control signal is selected to be at a wavelength which transits segment 136 at a rate which is different from that of the wavelength of clock signal 129. The control signal 127 wavelength and the clock signal wavelength are chosen with the fiber dispersion to give sufficient differential travel speed such that the control and clock pulses completely traverse one another over the length of fiber 136. For example, we assume that the control signal is selected to be at the "fast" wavelength; hence, the clock signal must enter the loop 131 first. Thus, the control signal can traverse or "slip" past the "mark" signal within the length of segment 136, even though the "mark" signal precedes the entrance of the control signal into segment 136.

The optional wavelength filter 142 further prevents any portion of the deteriorated optical data signal 127, which is not removed by coupler 137, from corrupting the regenerated data signal 141. Optical amplifier 143 amplifies the regenerated data signal to the proper level for transmission over fiber link 145. Optical amplifier 143 may be an erbium amplifier or other type of optical amplifier.

It should be noted again that in our example, the wavelength of the regenerated data signal 204 (e.g., $\lambda 1$) outputted to fiber link 145 is different from the wavelength of the deteriorated optical input data signal 203 received over fiber link 111 (e.g., $\lambda 2$). Thus, regenerator 150 can be viewed as a circuit which converts data signals at wavelength $\lambda 1$ to data signals at wavelength $\lambda 2$. If a communication system needs two repeaters and if the $\lambda 1$ to $\lambda 2$ repeater 120 is followed by a $\lambda 2$ to $\lambda 1$ repeater (not shown), then the wavelength of the data signal will be restored to $\lambda 1$.

The ability of repeater 120 to replicate input data signal 127 is due to the ability of the Sagnac switch 130 to absorb both amplitude jitter and timing jitter in the loop 131. The insensitivity to timing jitter is contributed by the speed differential between signals travelling at different speeds in loop 131. This has been thoroughly described in the previously referenced patent application of Gabriel et al. The tolerance to timing jitter is achieved by controlling the dispersion of the fiber in the loop, and the length of fiber between segments. The timing jitter tolerance should be chosen large enough to absorb timing jitter in the clock laser source 125, as well as any timing mismatches due to slight errors in the length of the delay around the Sagnac switch 130.

The insensitivity to amplitude jitter is due to the sinusoidal dependence of the transmission on the control energy due to the interference which takes place in the Sagnat switch interferometer. The energy of the logic 0 pulse should be controlled to produce a nonlinear phase shift in the Sagnat loop which is substantially less than the $\pi/4$ radians. The energy of the logic 0 pulses is determined in part by imperfections in the fiber circuit (such as an imperfect splitting ratio of the 50:50 coupler of the Sagnac, or imperfections in the polarization properties of the polarization sensitive couplers in the Sagnac switch), so can generally be kept low by careful construction of the circuit. The energy of the logic 1 pulses should be sufficient to give a nonlinear phase shift which is between approximately $\pi$ and $3\pi/2$, to ensure that the switch operates in a stable regime.

It should be noted that other well-known clock signal recovery circuits may be utilized. Also, the invention may be utilized in communication systems which utilize an optical transmission medium other than optical fiber, for example, a free-space medium. Additionally, the function of Sagnac switch 130 may be implemented using a Mach-Zehnder switch or other interferometer switch, using the Kerr effect, and arranged in an analogous manner to that disclosed herein. A polarization controller can be added to the data input port or to the clock input port to prevent polarization wander. In another repeater arrangement, it may be desirable to include a preamplifier and equalizer at the input of the repeater to increase the amplitude and reshape the input data to improve the operating capabilities of the repeater. In an alternate embodiment, the clock signal 129 can utilize one polarization signal and the control signal CII, I can be an orthogonal polarization signal. The fiber loop segment 136 may then be a polarization maintaining fiber.

What has been described is merely illustrative of the application of the principles of the present invention. Other arrangements and methods can be implemented by those skilled in the an without departing from the spirit and scope of the present invention.

We claim:
1. An optical signal regenerator arrangement comprising means for recovering an optical clock signal from a received data signal;
   means for injecting said clock signal into a controllable propagation speed medium, to develop a mark signal that travels in said medium in one direction and a reference signal that travels in said medium in the opposite direction;
   means for controllably injecting said received data signal into said medium, that travels through said medium in the direction of said mark signal, the timing of said data signal in relation to said mark signal controlled so that the data signal and the mark signal traverse each other while the mark signal is traveling through said medium; and
   means for combining said reference signal after its travel through said medium and said mark signal after its travel through said medium to generate a reconstructed data signal from said received data signal.

2. The arrangement of claim 1 wherein said means for combining is interferometric combining means.

3. The arrangement of claim 2 wherein said combining means develops an output signal at an output port when the signals applied to said combining means interfere constructively.

4. The arrangement of claim 2 wherein said combining means develops an output signal at a first output port when the signals applied to said combining means interfere constructively and an output signal at a second output port when the signals applied to said combining means interfere destructively.

5. The arrangement of claim 1 wherein said means for controllably injecting includes one or more of the following: means for injecting a control signal approximately when a mark signal is present in said transmission medium, means for injecting a control signal when a mark signal is absent in said transmission medium, and means for abstaining from injecting a signal when a mark signal is present in said transmission medium.

6. The arrangement of claim 1 wherein said controllable propagation speed medium is characterized by a propagation speed that is a function of a controllable signal parameter of said control signal.

7. The arrangement of claim 6 wherein said controllable signal parameter is the wavelength of the control signal.

8. The arrangement of claim 7 wherein said clock signal is one wavelength and said control signal is of a different wavelength.

9. The arrangement of claim 6 wherein said controllable propagation speed medium has a non-linear index of refraction.

10. The arrangement of claim 6 wherein said controllable signal parameter is controlled to produce a phase shift on each mark signal as it travels said medium with said control signal such that it is altered by substantially $\pi$ radians from the phase shift of said mark signal as it travels said medium without said control signal.

11. The arrangement of claim 6 wherein said controllable signal parameter is the intensity of the control signal.

12. The arrangement of claim 1 wherein in the controllable progapation speed medium in said transmission medium signals of different wavelengths propagate at different speeds and wherein the propagation speed for a first wavelength signal when a second wavelength signal is present differs from the propagation speed for that first wavelength signal when the second wavelength signal is absent.

13. The arrangement of claim 1 wherein said mark signal is polarized and said control signal is polarized, and the polarization of said mark signal is orthogonal to the polarization of said control signal.

14. The arrangement of claim 1 wherein said means for injecting a signal is a four-port coupler having its first port connected as an input port, its second and fourth ports connected to, respectively, a first and second ends of said transmission medium, the ports being both input and output ports, and its third port forming an output port of said arrangement.

15. The arrangement of claim 1 further comprising a coupler connected to said transmission medium for extracting the control signal traveling in said medium.

16. An optical communication system comprising means for transmitting an optical data signal over an optical communication medium producing a deteriorated optical data signal and means for regenerating the transmitted data signal from said deteriorated data signal, said regenerator means including means for removing a clock signal from said deteriorated data signal;

means for injecting said clock signal into a controllable propagation speed medium, to develop a mark signal that travels in said medium in one direction and a reference signal that travels in said medium in the opposite direction;

means for controllably injecting said deteriorated data signal into said medium, that travels through said medium in the direction of said mark signal, the timing of said deteriorated data signal in relation to said mark signal controlled so that the deteriorated data signal and the mark signal traverse each other while the mark signal is traveling through said controllable propagation speed medium; and means for combining said reference signal after its travel through said medium and said mark signal after its travel through said medium to regenerate a data signal from said deteriorated data signal.

17. The system of claim 16 wherein
said regenerating means is part of a repeater apparatus including an amplifier for amplifying said regenerated data signal.

18. The system of claim 16 wherein
said regenerating means is pan of a receiver apparatus including means for converting said regenerated data signal into an electronic data output signal.

* * * * *